United States Patent [19]

Kinoshita et al.

[11] Patent Number: 4,933,839
[45] Date of Patent: Jun. 12, 1990

[54] VECTOR PROCESSOR

[75] Inventors: Yoshiaki Kinoshita, Hadano; Yoshiharu Kazama, Hadano; Yoshio Takamine, Kokubunji, all of Japan

[73] Assignee: Hitachi, Ltd., Tokyo, Japan

[21] Appl. No.: 79,047

[22] Filed: Jul. 29, 1987

[30] Foreign Application Priority Data

Sep. 10, 1986 [JP] Japan .................. 61-211603

[51] Int. Cl.$^5$ .............................. G06F 7/02
[52] U.S. Cl. .................. 364/200; 364/232.21; 364/259.2
[58] Field of Search ... 364/200 MS File, 900 MS File

[56] References Cited

U.S. PATENT DOCUMENTS

| | | | |
|---|---|---|---|
| 3,976,864 | 8/1976 | Gordon et al. | 371/29 |
| 4,105,999 | 8/1978 | Nakamura | 371/37 |
| 4,342,084 | 7/1982 | Sager et al. | 364/200 |
| 4,604,709 | 8/1986 | Blount et al. | 364/900 |
| 4,734,676 | 3/1988 | Huon et al. | 364/715 |

Primary Examiner—Thomas M. Heckler
Assistant Examiner—Debra A. Chun
Attorney, Agent, or Firm—Antonelli, Terry, Stout & Kraus

[57] ABSTRACT

A vector processor has a discriminator for determining in one machine cycle of an operation unit whether a bit pattern of elements of vector data meets a predetermined condition or not. An output of a register having a predetermined value loaded only into bits to be extracted from the vector data and each of the elements of the vector data are ANDed or ORed so that the bit pattern is determined. The operation and determination are sequentially carried out in one machine cycle.

8 Claims, 3 Drawing Sheets

VECTOR PROCESSOR

CROSS REFERENCE TO OTHER APPLICATION

This application relates to U.S. Pat. No. 4,773,006 entitled "Vector Processor" and issued on Sept. 20, 1988.

BACKGROUND OF THE INVENTION

The present invention relates to a program controlled digital computer, and more particularly to a vector processor which is suitable for carrying out a vector operation at a high speed.

A vector processor has been used for high speed calculation, such as a large scale matrix calculation of the type frequently called for in scientific and technical calculations. In such a vector processor, an operation such as that shown in the following FORTRAN instruction is vector-processed at a high speed.

```
DO 10 i=1, N
IF (A(i).EQ. 3)
THEN B(i)=1
10 CONTINUE
```

Namely, (A(i).i=1, N) is defined as a vector A and (B(i).i=1, N) is defined as a vector B. When a vector element (A(i)) of the vector A is equal to 3, "1" is substituted for the corresponding vector element (B(i)) of the vector B. The vector processor carries out such a vector operation at a high speed by using a vector processing technique.

However, when a part of a structure of the following PL/I instruction is to be compared with contents of FLAGS 1 and 2, the process is very complex.

```
DCL    1  FLAG (50),
       2  FLAG 1   BIT (1),
       2  *        BIT (30),
       2  FLAG 2   BIT (1);
DO i=1 TO 50;
       IF FLAG 1  (i) = '1'B &
          FLAG 2  (i) = '1'B
       THEN A(i) = B(i);
END;
```

If this PL/I instruction is executed by using the above vector processing technique, the following vector instruction objects are generated.

| VL   | VR0, FLAG      |
| VEO  | VR4, VR0, SR0  |
| VCEQ | VMR0, VR4, SR4 |
| VL   | VR8, B         |
| VSTN | VR8, A         |

Of those fine instructions, the upper three correspond to the IF clause and the lower two correspond to the THEN clause.

The abbreviations of the above instructions are explained below.

| VL:   | VECTOR LOAD, |
| VEO:  | VECTOR-ELEMENTWISE OR, |
| VCEQ: | VECTOR COMPARE EQUAL, |
| VSTN: | VECTOR STORE NEGATIVE MASK |
| VRi:  | i-th vector register |

-continued

| SRi:  | i-th scalar register |
| VMRi: | i-th vector mask register |

A 4-byte hexadecimal number '7FFFFFFE' is preset in SR0, and a 4-byte hexadecimal number 'FFFFFFFF' is preset in SR4.

DO i=1 TO 50 in the PL/I instruction is considered as one vector column, and the decision for the next IF clause is carried out by a VL instruction, VE0 instruction and VCEQ instruction. In accordance with the result thereof, a substitution of A(i)=B(i); described by the THEN clause is stored in an array A, while all elements of an array B are loaded by the VL instruction, and data satisfying the condition in the If sentence are is selected by a masked VSTN instruction.

However, as seen from the above example, three vector registers VR0, VR4, VR8 in the DCL clause, two scalar registers SR0 and SR4 in the IF clause and one mask register VMR0 in the THEN clause are occupied for one decision by the program. This impedes effective utilization of registers. The instruction sequence also takes two steps only for a decision. These circumstances makes it difficult to vectorize for a structured programming language, such as PL/I.

Such a technique is disclosed in JP-A-60-15772.

Such a vector processor is described in "Hitach Super Computer S-810 Array Processor System" by Toshihiko Okada et al, Elsevier Science Publishers B.V. (North-Holland), 1986, pages 113–136.

The prior technique does not pay attention to bit determination in a structure as frequently used in the structured programming language represented by PL/I and has problems in that the instruction sequence is complex and many register resources are used.

A reason therefor is that the vector processor is usually utilized for speed-up of processing of a language for carrying out a numeric operation represented by FORTRAN and it is not utilized for speed-up of PL/I which requires complex logical operations. This is because a large capacity array for a large scale matrix operation which is a base of vectorization is easy to handle in FORTRAN. However, in recent years, the large capacity array is required even in PL/I in a field of a data base and the vectorization of the bit determination for a structure is becoming feasible.

SUMMARY OF THE INVENTION

It is an object of the present invention to provide a vector processor which carries out bit determination in a structure necessary for speeding up processing for a structured programming language, such as PL/I, by the vector processor with a small number of register resources at a high speed.

The above object is achieved by providing in the vector processor an operation unit which extracts a group of any bit positions for a vector element in a data vector and determines whether the bits are all 0's, all 1's or a mixture of 1's and 0's.

In order to determine whether both bit positions i and j of a vector V1 are 0 or not, a mask R1 having "1's" at the bit positions i and j and 0's" at other bit positions is prepared. In an operation unit C1, a logical AND function of the mask R1 and each of the vector elements of the vector V1 is determined, and if all of the results are zero, "1" is set into the corresponding element of decision result R2, and otherwise "0" is set. As a result, it is determined that both the bit positions i and j of the vector elements of the vector V1 are zero when the decision result R2 is "1". Thus, the determination is easily done by designating any of the bit positions in any number by the mask R1.

BRIEF DESCRIPTION

DESCRIPTION OF THE PREFERRED EMBODIMENTS

Figure 1:
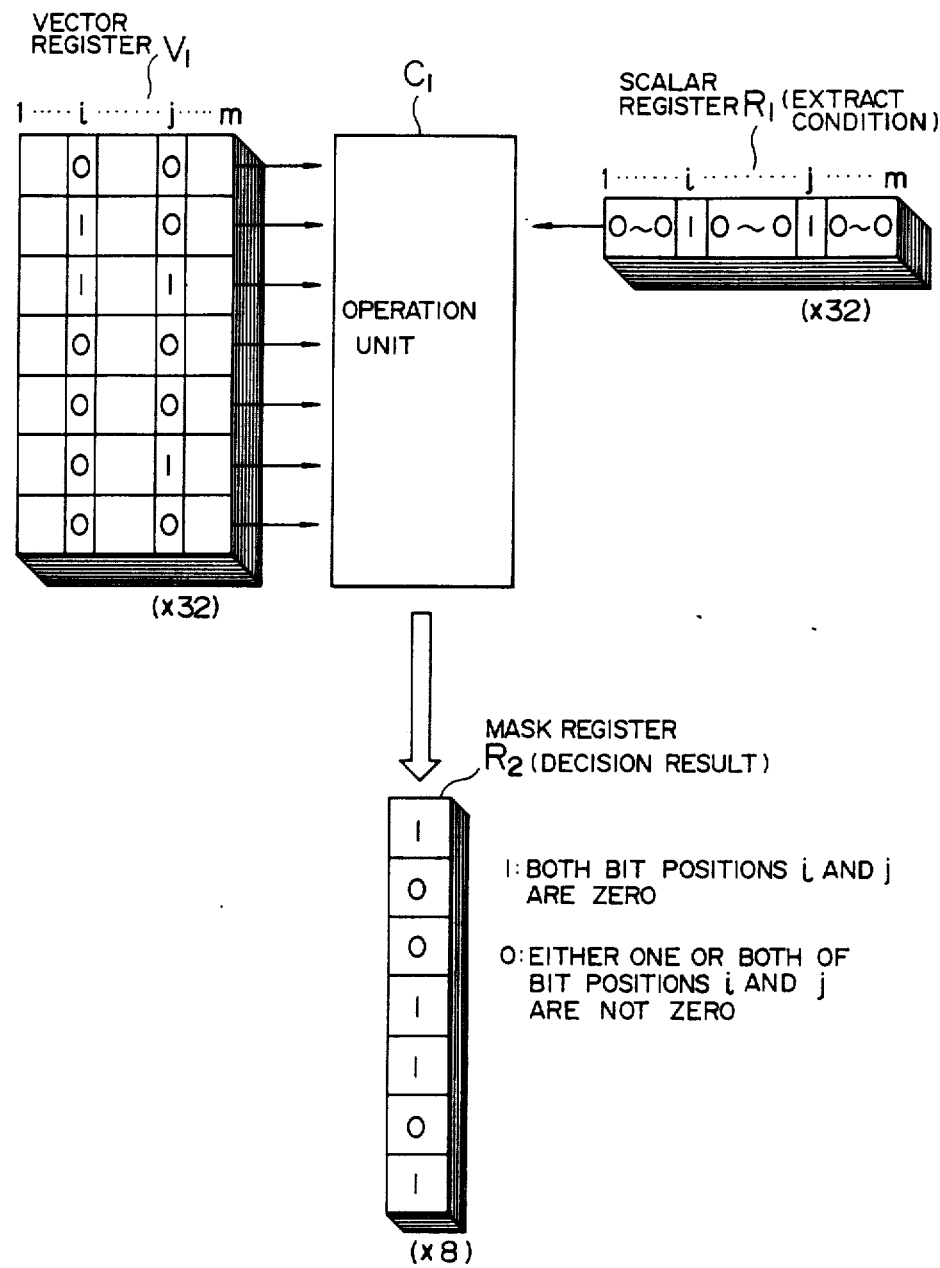
FIG. 1 shows processing in the present invention.

An outline of the present invention is explained with reference to FIG. 1. In FIG. 1, when it is to be determined whether bit positions i and j of a vector V1 are both "0" an extract condition register R1 having "1's" at bit positions i and j and "0's" at other positions is provided. An operation unit C1 calculates a logical AND function between the extract condition and each vector element of the vector V1. If all results are zero, "1" is set into a corresponding element of a decision result R2, and if not, "0" is set into the corresponding element. As a result, it is determined that the bit positions i and j of the vector element of the vector V1 are both zero when the decision result R2 is "1". In this manner, the determination is easily obtained by designating any number of bit positions by the extraction condition or scalar register R1. When it is to be determined whether the bit positions i and j are both "1" a scalar register R1 having "0's" set in the bit positions i and j and "1's" set in the other bit positions is provided, and the operation unit C1 calculates a logical OR function of the register R1 and each of the vector elements.

Figure 2:
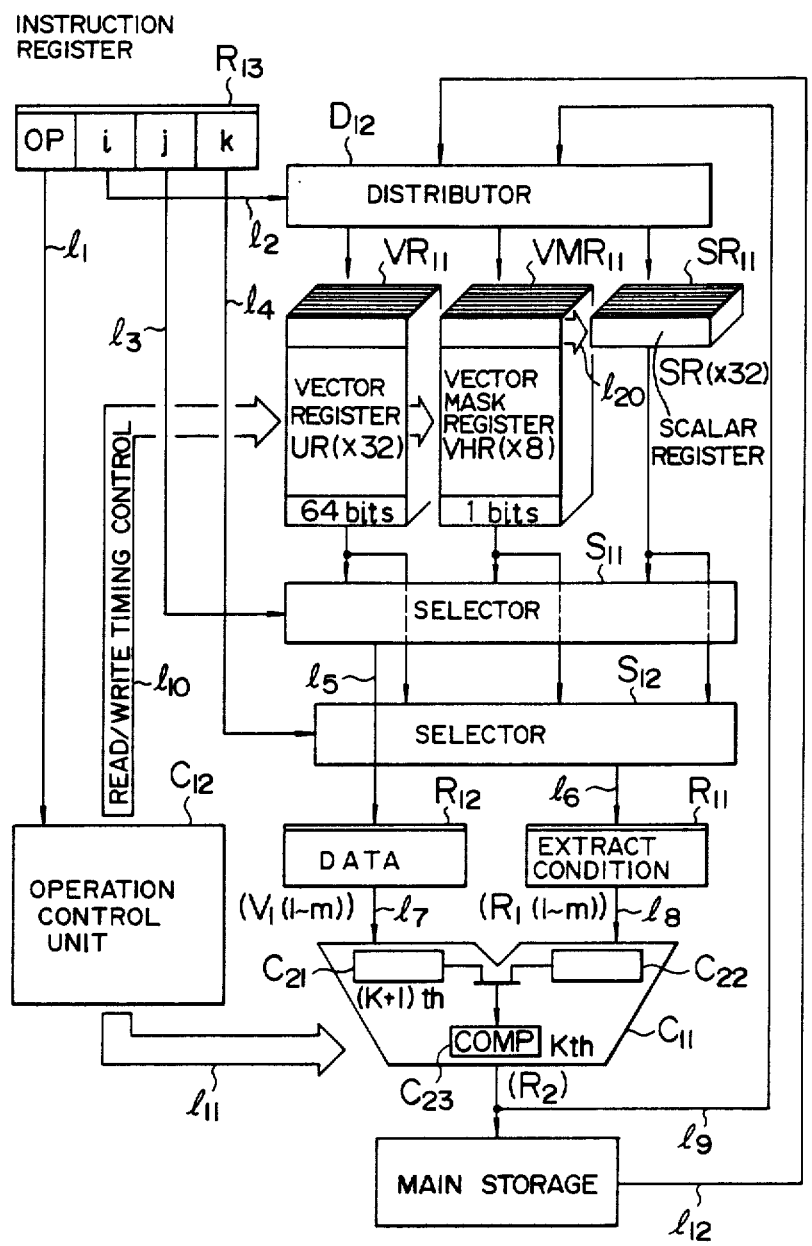
FIG. 2 shows one embodiment of the present invention.

FIG. 2 shows one embodiment of the vector processor of the present invention. In FIG. 2, R13 denotes an instruction register which is divided into four fields. An OP field contains an operation code which is sent to an operation control unit C12 through a line 11 to control instruction execution. An i field designates one of the vector register 11, register VMR 11 and scalar register SR 11 to store a result. It is supplied to a distributor D12 through a line 12 and the distributor supplies the result provided by the operation unit C12 through a line 19 to the designated register. A j field designates a register to be used for the operation from the vector register VR11, mask register VMR11 and scalar register SR11. It is supplied to the selector S11 through a line 13 and the selector S11 selects one of the registers. The selected content is sent over the line 15. A k field is identical to the j field and it is supplied to a selector S12 and the selected content is sent over a line 16. The mask register holds a condition mask for the vector for the operation or decision to be carried out in the next step.

R12 denotes a data register for holding data, R11 denotes an operation mask register for holding an operation mask, and the operation unit C11 carries out the operation through a line 18. The line 17 is a data line over which the content of the data register R12 is sent; the line 18 is the data line over which the content of the operation mask register R11 is sent; the line 19 is the data line over which the result of operation by the operation unit C2 is carried; the line 110 is the control line to indicate read or write of each register; and the line 111 is the control line to control the operation unit C11.

The vector register VR11, scalar register SR11 and vector mask register VMR11 correspond to V1, R1 and R2 of FIG. 1, respectively. The VMR11 is a one-bit register which contains only "0" or "1".

The operation is now explained. When an instruction which specifies the execution of the present operation is loaded into the instruction register R13, the contents of the OP, i, j and k fields are sent to the operation control unit C12, distributor D12, selector S11 and selector S12, respectively. The distributor D12, selector S11 and selector S12 select the registers designated by the fields i, j and k, respectively, to establish a distribution route and a selection route. In the present embodiment, the field i designates the vector mask register VMR11, the field j designates the vector register VR11 and the field k designates the scalar register SR11.

The operation control unit C12 sends the read or write command to the appropriate register through the line 110 and reads the vector register VR11 designated by the field j sequentially one vector element at a time at an appropriate timing. The content of the scalar register SR11 designated by the field k is initially read only once. For example, SR0 is hexadecimal '7FFFFFFE' and SR4 is 'FFFFFFFF'. Writing to the mask register VMR11 designated by the field j is sequentially carried out.

The data sequentially loaded into the data register R12 is supplied to the operation unit C11 through the line 17. The operation mask to be used in the present operation is supplied to the operation mask register R11 and it is supplied to the operation unit C11 through the line 18. The operation unit C11 carries out the logical operation by the operation mask for the data in accordance with the operation code set in the OP field and makes a decision for the designated bit positions in accordance with the operation result. The decision is sent out to the line 9, supplied to the distributor D12, and stored in one of the vector mask registers VMR11. This vector mask register VMR is repeatedly used as a mask through the line 120 in the operation which uses various masks as the condition so that execution of a complex instruction for all vector elements is attained.

Figure 3:
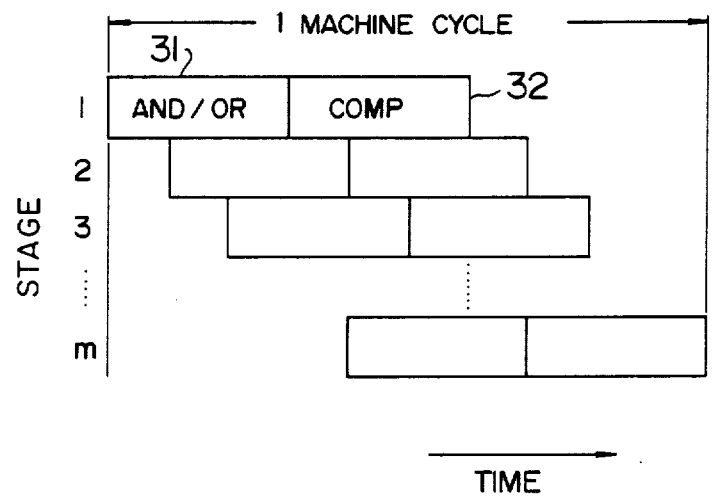
FIG. 3 shows a convolution chart to show a parallel operation of a series of arithmetic operations and comparison in one machine cycle.

In accordance with the present embodiment, the determination of bit positions, which is frequently required in the structured program, can be attained by the vector processing by one instruction using one vector register, one mask register and one scalar register in approximately one machine cycle as shown in FIG. 3. The determination is due to the provision of the comparator C23 in the operation unit C11 which compares the value "1" with the operation result of the content of the two input means C21 and C22.

At the timing shown in the box 31 of FIG. 3, the AND or OR operation is carried out, and at the timing shown in the box 32, the result is determined so that the decision result as shown in FIG. 1 is obtained. The two input means C21 and C22 each has a function to operate the inputs of the vector elements which are shifted by approximately 1/m cycle from each other as shown by stages 1, 2, 3, ---, m in FIG. 3.

While the binary vector data has been explained, the present invention is equally applicable to the determination of a bit pattern by a ternary logic.

What is claimed:

1. A vector processor for determining the respective values of selected bits of vector elements of a vector in response to a single vector instruction in one machine cycle, comprising:

(a) vector register means for storing a vector having a plurality of vector elements each including a plurality of bits;

(b) extract condition register means for storing extract condition data including a number of bits, wherein a selected plurality of the bits of said extract condition data all have a first binary value and the remaining bits of said extract condition data all have a second binary value; and (c) operation means coupled to said vector register means and said extract condition register means for effecting a logical operation between each vector element of a vector in said vector register means and said extract condition data in said extract condition register means and for determining as a result of said logical operation whether all selected bits in each vector element are "0", "1" or a mixture of "0" and "1" bits based on a comparison between said all selected bits and a reference pattern.

2. A vector processor according to claim 1, wherein said operation means includes means for storing results of said logical operations for the respective vector elements of said vector in said extract condition register means as extract condition data.

3. A vector processor according to claim 1, wherein said operation means comprises a first operation unit including means for carrying out an AND operation between the bits of each of the vector elements in a vector stored in said vector register means and extract condition data in which said first binary value is "1" and said second binary value is "0", and first means for determining that all selected bits of a respective vector element are "0" when all operation results of said AND operation for the vector element are "0".

4. A vector processor according to claim 1, wherein said operation means further comprises a second operation unit including means for carrying out an OR operation between the bits of each of the vector elements in a vector stored in said vector register means and extract condition with a bit position to data in which said first binary value is "0" and said second binary value is "1", and means for determining that all selected bits of a respective vector element are "1" when all operation results of said OR operation for the vector element are "1".

5. A vector processor according to claim 3, wherein said operation means further comprises a second operation unit including means for carrying out an OR operation between the bits of each vector element in said vector and extract condition data in which said first binary value is "0" and said second binary value is "1", second means for determining that all selected bits of a respective vector element are "1" when all operation results of said OR operation for the vector element are "1", and third means for determining that the selected bits of a respective vector element are mixture of "0" and "1" when said first determining means fails to indicate that all bit positions to be extracted are "0" and said second determining means fails to indicate that all such bit positions are "1".

6. A vector processor for determining a pattern of bit data at selected positions extracted from vector elements of vector data in response to a vector processing instruction, comprising:

(a) vector register means for holding vector data;

(b) extract condition register means for holding extract condition data to be combined in a logical operation with one of the vector data;

(c) an operation unit, responsive to said vector processing instruction and connected to said vector register means and said extract condition register means, for determining a pattern of data at selected bit positions designated by said extract condition data by effecting a logical operation between said vector data and said extract condition data, said operation unit including comparator means for comparing data resulting from the logical operation with a reference data pattern, wherein said extract condition register means, said operation unit and said comparator operate within one machine cycle to effect execution of said vector processing instruction.

7. A vector processor according to claim 6, further comprising a vector mask register connected to receive the output of said comparator, wherein the output of said comparator supplied to said vector mask register is supplied to said extract condition register and is stored therein as extraction condition data.

8. A vector processor according to claim 7, further comprising an instruction register having an OP field for designating OR function or AND function as said logical operation, and a register designation field for designating one of said vector register means, said vector mask register and said extract condition register as a source destination of data for said logical operation.

* * * * *